J. R. BROWN.
METHOD OF BONDING RAILS AND LIKE CONDUCTORS.
APPLICATION FILED MAY 11, 1916.
1,214,005.  Patented Jan. 30, 1917.
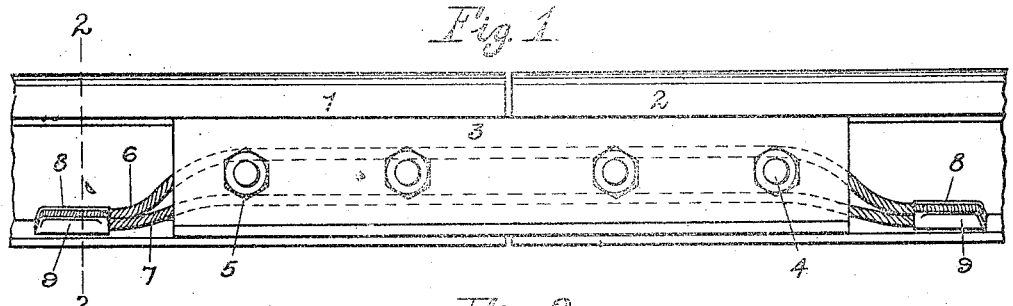
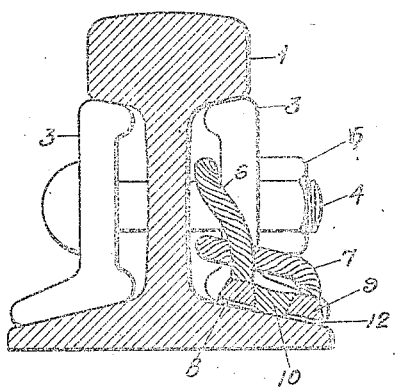
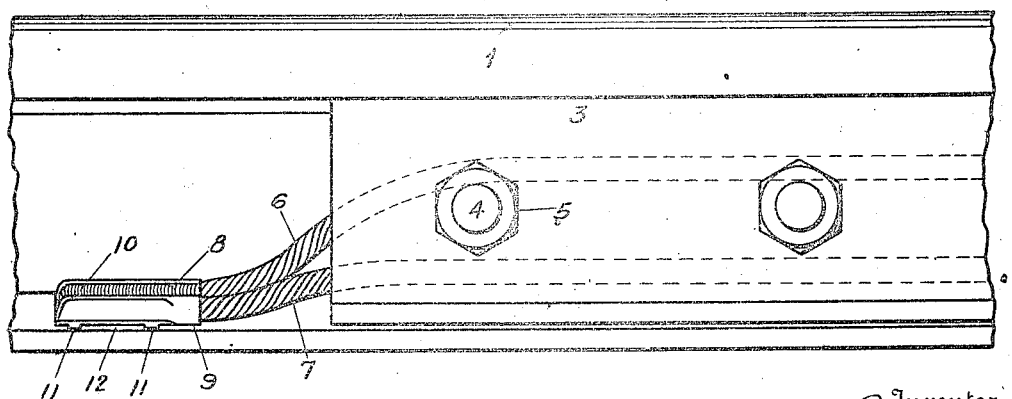

UNITED STATES PATENT OFFICE.

JOHN R. BROWN, OF MANSFIELD, OHIO, ASSIGNOR TO THE OHIO BRASS COMPANY, OF MANSFIELD, OHIO, A CORPORATION OF NEW JERSEY.

METHOD OF BONDING RAILS AND LIKE CONDUCTORS.

1,214,005.   Specification of Letters Patent.   Patented Jan. 30, 1917.

Application filed May 11, 1916. Serial No. 96,871.

*To all whom it may concern:*

Be it known that I, JOHN R. BROWN, a citizen of the United States, residing at Mansfield, in the county of Richland and State of Ohio, have invented certain new and useful Improvements in the Method of Bonding Rails and like Conductors, of which the following is a specification.

This invention relates to the improvement in the method of electrically uniting or bonding rails used as conductors of electricity and the like.

One object of my invention is to provide a connection around the adjacent ends of two rails without the use of rivet, bolt, expanding pin, etc.

Another object of my invention is to be able to bond the adjacent ends of rails without removing or disturbing the splice plates and still have the greater portion of the rail bond protected by passing the bonds through the opening between the splice plate and rail.

Another object of my invention is to form an integral union between the bond terminals themselves and the rail by welding the terminals to the rail thus giving a highly efficient connection mechanically and electrically.

Still another object of my invention is to provide a means which is economical in bonding rails in that I am able to simultaneously connect two bond terminals together and to the rail, thus saving heat energy and time over that of applying each terminal separately.

A still further object of my invention is to provide means for attaching bond terminals to the rail whereby the rail bond used can be provided with terminals of such shape that they will pass between the splice plate and rail.

With the above and other objects in view, which will appear later, the same consists in the novel construction, location, application of heat, and welding or filling-in metal as hereinafter described and then claimed.

Referring to the drawings—Figure 1 is a side elevation of a rail joint, showing the location of the bonds I use with respect to the rail joints and splice plates. Fig. 2 is an enlarged sectional view of the rail joints taken on the line 2—2 Fig. 1. Fig. 3 is an enlarged side elevation of one set of terminals to better show their relation to each other and to the rail.

My experience in bonding rails has shown me that it is desirable to provide a method of bonding rails which will permit the bond to be so constructed that it will readily pass between the splice plate and the rail without disturbing the splice plate; at the same time a bond of such construction will necessarily have a limited capacity and a terminal of small dimension and not suited to be bolted, riveted or compressed into a hole in the rail as is the usual method of attaching bond terminals to rails. It is desirable therefore in order to secure the required bonded capacity to use two or more bonds around the joints.

In Fig. 1 the rails to be bonded are designated by numerals 1 and 2; the splice plates by 3, a corresponding plate being on the opposite side; 4 and 5 designate the bolts and nuts respectively for holding the splice plates in position. Numerals 6 and 7 designate two bonds which have been passed around the joint between the plate and rail and provided with terminals 8 and 9 and brought into position on the rail for attachment.

Figs. 2 and 3 show to better advantage the position of the terminals with respect to the rail and to each other.

It will be observed by Figs. 2 and 3 that the terminals suitable for passing between the splice plate and rail are of such character that they are not suitable to be attached by bolting, clamping or expanding in holes in the rail, etc., as is ordinarily done, therefore, I have devised a method of applying the terminals to the rail which will permit of making a permanent, highly efficient union, electrically and mechanically by means of which method the two adjacent terminals can be attached to the rail simultaneously and at the same time united into one terminal through the medium of added metal shown by numeral 10 in Fig. 2 and which I more fully describe later on.

The method which I have devised for the bonding of rails is as follows:—The bonds are first passed beneath the splice plate as shown in Fig. 1 and their terminals placed in position on the rail as better shown in Figs. 2 and 3. It will be noted in Fig. 2 that the terminals proper are spaced apart and parallel to each other. The terminals being in position, I make use of the oxy-acetylene flame or a flame of like character, or the electric arc, etc., for simultaneously bringing the rail between the terminals and the terminals themselves up to a melting point and then adding at the point of application of the heat, metal preferably in the form of a rod or thin stick which is immediately melted down and unites with the molten surfaces of the rail and bond and which will immediately solidify upon removing the source of heat, thus uniting the terminals, the rail and the added metal into an integral unit. The flame is now moved along the terminals slightly and the previous process repeated until the entire space between the terminals has been filled with the added metal, thus forming as it were the two terminals into one terminal throughout their length and at the same time welding them to the rail.

By applying the added metal between the bond terminals it is possible to unite the two terminals at the same time, thus saving gas or electricity used and the time required, which on a large installation amounts to many dollars in saving.

It is possible of course to place the terminals in contact at their inner faces and apply the added metal to the outside face of each terminal and to the rail but this requires more time and heat.

To facilitate the work, I place small projections 11 on the base of the bond terminal next the rail which produce a slight space 12 therebetween, Figs. 2 and 3, and which permit the heat waves to pass away readily in place of being reflected and thereby preventing a thorough and reliable contact of the added metal 10 to the rail and bond terminal.

The offsetting of the terminals from the rail just described, I consider a very valuable feature in the construction of the bond used in my method of bonding.

The form of heat used is one which is very intense, approximately 6,000 degrees Fahrenheit, and is concentrated, therefore only a very short length of terminal is welded at a time, but the heat is so intense that the work is done very quickly and the apparatus required is very simple and inexpensive.

While I have described the details of the preferred method of my invention, it is apparent that various modifications may be made by one skilled in the art without departing from the spirit and scope of my invention and it is not desired to be limited to the exact details shown.

What I claim is:—

1. The method of electrically connecting or bonding the adjacent ends of rails held by splice plates which consists in passing two or more rail bonds around the adjacent ends of the rails to be bonded and between the rails and the splice plates, and welding the ends of the bonds together and simultaneously to the rails.

2. The method of bonding the adjacent ends of rails held by splice plates consisting in passing one or more rail bonds having elongated terminals between the already installed rails and splice plates and welding the terminals to the rail by adding molten metal forming an integral union with the bond terminal and rail.

3. The method of bonding the adjacent ends of rails held by splice plates consisting in threading around the joint and between the rails and splice plates, two or more rail bonds provided with terminals which will pass between the rails and splice plates without removing same, bringing the terminals adjacent to each other and building up the space there-between by means of molten metal integrally united to the terminals and to the rail forming thereby a bonded joint.

4. An electrical connection consisting of a rail, a plurality of bonds provided with terminals, faces on the terminals, one face on each terminal resting next the rail surface, one face on each terminal facing each other and metal integrally united to the rail between the terminals and to the face on each terminal facing each other.

5. An electrical connection consisting of a rail, a plurality of bonds each provided with terminals, the terminals at each end placed next the rail and spaced apart and metal united integrally with the terminals and the rail.

6. An electrical connection consisting of a rail, a plurality of bonds each provided with terminals, the terminals at each end placed next the rail and spaced apart and metal uniting integrally with the terminals and the rail, the metal located in the space between the terminals.

7. An electrical connection consisting of a rail, a plurality of bonds, each provided with a terminal having means for offsetting from the rail and metal welded to the rail and terminals uniting the terminals into one.

8. The method of electrically connecting or bonding the adjacent ends of rails held by splice plates which consists of passing two or more rail bonds around the adjacent ends of the rails to be bonded and welding the ends of the bonds together and to the rail simultaneously.

9. The method of bonding adjacent rails consisting in spanning the joints with two or more bonds, placing the terminals in position on the rail approximately parallel and spaced apart and filling up the space therebetween by means of successive application of molten metal integrally united to the terminals and to the rail forming thereby a bonded joint.

In testimony whereof I affix my signature in the presence of two witnesses.

JOHN R. BROWN.

Witnesses:
W. W. HUNZICKER,
W. P. BOVARD.